United States Patent [19]
Kumar et al.

[11] Patent Number: 5,949,508
[45] Date of Patent: Sep. 7, 1999

[54] PHASE SEPARATED COMPOSITE ORGANIC FILM AND METHODS FOR THE MANUFACTURE THEREOF

[75] Inventors: Satyendra Kumar; Valeri Vorfloussev, both of Kent, Ohio

[73] Assignee: Kent State University, Kent, Ohio

[21] Appl. No.: 08/988,146

[22] Filed: Dec. 10, 1997

[51] Int. Cl.⁶ .................................................. G02F 1/1333
[52] U.S. Cl. .......................................... 349/122; 349/184
[58] Field of Search ............................... 349/86, 88, 122, 349/184

[56] References Cited

U.S. PATENT DOCUMENTS

| | | | |
|---|---|---|---|
| 5,321,533 | 6/1994 | Kumar | 359/51 |
| 5,327,271 | 7/1994 | Takeuchi et al. | 349/88 |
| 5,434,685 | 7/1995 | Pirs et al. | 359/51 |
| 5,473,450 | 12/1995 | Yamada et al. | 359/51 |
| 5,504,600 | 4/1996 | Pirs et al. | 359/51 |
| 5,530,566 | 6/1996 | Kumar | 359/51 |
| 5,583,672 | 12/1996 | Kim | 349/92 |
| 5,589,959 | 12/1996 | Hikmet | 349/88 |
| 5,812,227 | 9/1998 | Toshida et al. | 349/88 |

FOREIGN PATENT DOCUMENTS

WO 96/04586   2/1996   WIPO .

OTHER PUBLICATIONS

Krongauz et al., Kinetics of Anisotropic Photopolymerization in Polymer Matrix, Polymer, vol. 32, No. 9 (1991), pp. 1654–1662.

Kitzerow et al., Linear Electro–Optic Effects in Polymer–Dispersed Ferroelectric Liquid Crystals, Appl. Phys. Lett., vol. 60, No. 25 (Jun., 1992), pp. 3093–3095.

Lee et al., Fast Linear Electro–Optical Switching Properties of Polymer–Dispersed Ferroelectric Liquid Crystals, Appl. Phys. Lett., vol. 64, No. 6 (Feb., 1994), pp. 718–720.

Lovinger et al., Morphological Investigation of UV–Curable Polymer–Dispersed Liquid–Crystal (PDLC) Materials, Chem. Mater., vol. 6, No. 10 (1994), pp. 1726–1736.

Molsen et al., Bistability in Polymer–Dispersed Ferroelectric Liquid Crystals, J. Appl. Phys., vol. 75, No. 2 (Jan., 1994), pp. 710–716.

Hikmet et al., Anisotropic–Network–Stabilized Ferroelectric Gels for Active Matrix Addressing, J. Appl. Phys., vol. 79, No. 10 (May, 1996), pp. 8098–8105.

Kataoka et al., Liquid–Crystalline Polymer–Stabilized FLCDs Exhibiting an Excellent Bistability or Quasi–Electroclinic Effect, SID Digest (1996), pp. 699–702.

Komitov et al., Polymer Dispersed Short Pitch Ferroelectric Liquid Crystals, Ferroelectrics, vol. 179 (1996), pp. 93–102.

Carter et al., Dependence of the Morphology of Polymer Dispersed Liquid Crystals on the UV Polymerization Process, J. Appl. Phys., vol. 81, No. 9 (May, 1997), pp. 5992–5999.

*Primary Examiner*—James A. Dudek
*Attorney, Agent, or Firm*—Renner, Kenner, Greive, Bobak, Taylor & Weber

[57] ABSTRACT

A light modulating cell comprises a pair of substrates, alignment layers disposed on at least one of the substrates and a solution of polymerizable prepolymer and low molecular weight organic material disposed between the pair of substrates. The solution is phase separated and forms a layer of polymeric material and a layer of organic material between the two substrates. An external force may then be applied across the substrates to alter the optical appearance of the layer of organic material from one state to another. A photo-sensitive layer may also be provided in the cell.

25 Claims, 5 Drawing Sheets

PHASE SEPARATED COMPOSITE ORGANIC FILM AND METHODS FOR THE MANUFACTURE THEREOF

TECHNICAL FIELD

The present invention herein resides in the art of light modulating devices and devices that employ composite organic materials. More specifically, the present invention relates to polymers and liquid crystal (LC) materials used in such devices and displays. Specifically, the present invention relates to light modulating elements in which a composite layer of light modulating material is formed by phase separation of a solution of prepolymer and a low molecular weight organic fluid.

BACKGROUND ART

Several types of light modulating liquid crystalline materials are currently known. Ideally, these materials provide desirable features such as high contrast, fast switching times between different optical states and wide viewing angles. Some other desirable features are low power consumption to switch and maintain optical states, mechanical, thermal, and electrical stability, and ease of fabrication.

One category of organic material that exhibits most of the above desirable characteristics are ferroelectric liquid crystals which are also referred to as chiral smectic C liquid crystals. Smectic liquid crystals consist of long, rod-like molecules arranged in layers. In instances where the molecules are tilted at an angle to the layers, they are called smectic C liquid crystals. When a chiral group is incorporated into the material's molecules or when a chiral substance is added to the smectic liquid crystal, the molecules form a helical pattern along a direction perpendicular to the layers. These structures are known as ferroelectric liquid crystals. It is known that ferroelectric liquid crystals provide extremely fast switching times compared to nematic or cholesteric liquid crystal materials. Additionally, the viewing angles of ferroelectric displays are much wider than most other types of liquid crystal displays.

In particular, the chiral smectic C* mesophase, which is a ferroelectric liquid crystal (FLC) phase, is mainly used for light modulation in surface stabilized FLC (SSFLC) devices, ferroelectric gels, deformed helix formation (DHF) effect devices and polymer dispersed FLC (PDFLC). SSFLC and DHF devices employ pure FLC filled in a cell comprising two flat substrates each with alignment layer. Ferroelectric gels include pure FLC, which has a relatively small amount of polymer dissolved therein, oriented by the substrates with alignment layers, wherein polymer is evenly distributed throughout the FLC and becomes part of the optically active aspects of the cell. PDFLC devices, which utilize droplets of FLC embedded in a polymer matrix induced by phase separation, can also be used as light modulating elements. Alignment of a FLC director inside the droplets is obtained by highly anisotropic action of the polymer matrix or by external forces, such as an applied electromagnetic field or shearing.

As those skilled in the art will appreciate, devices using SSFLC and DHF materials and ferroelectric gels require that a relatively small cell gap, about 1.5 μm, be utilized to obtain optimum contrast and transmission. Moreover, high uniformity of cell spacing between the substrates is essential. In other words, the device will not perform adequately unless the material is uniformly oriented between properly and precisely separated cell substrates. Still another disadvantage of these devices is that they are highly susceptible to mechanical, thermal, and electrical shock or stress. Yet another disadvantage is that these materials tend to develop textural defects, such as zig-zag defects, during device fabrication. It is also difficult to obtain desirable properties such as grey scale in SSFLCs.

The PDFLC light modulating devices possess grey scale properties and are free of several of the disadvantages of the other three devices; however, they have their own particular disadvantages. In particular, the refractive indices of both the polymer and FLC, must match to avoid light scattering from the droplets' surface. Another disadvantage is that the PDFLC devices often require high applied voltages for optimum performance and as such, are not conducive to control by low voltage electronic drivers.

In regard to optical appearance, pure SSFLC cells using a polarizer and a crossed analyzer illuminated with white light have a contrast ratio of greater than 100 and a transmission value of about 80 percent of the maximum possible. But as noted previously, SSFLC devices are very sensitive to mechanical shock which can easily damage liquid crystal alignment and render them unusable.

Several other liquid crystal materials likely to be used for light modulation, are antiferroelectric liquid crystals (AFLC), cholesteric and nematic liquid crystals. AFLCs are also sensitive to mechanical deformations and thermal shocks and require a small but uniform cell gap. Being relatively unexplored for applications, their physical parameters remain to be optimized for electrooptical applications. Main disadvantages of nematic and cholesteric devices are their slow response and narrow viewing angle.

DISCLOSURE OF INVENTION

In light of the foregoing, it is a first aspect of the present invention to provide a phase separated composite organic film (PSCOF) and a method for manufacturing such a film, wherein the film exhibits very high contrast, relatively high transmission, and mechanical stability.

Another aspect of the present invention is to provide a cell with a phase separated composite organic film made from a polymerizable composite of a low molecular weight (LMW) organic material and a prepolymer disposed between two substrates.

Still another aspect of the present invention, as set forth above, is to provide a technique for phase separating a prepolymer component from a LMW organic component to form a layer of polymeric material substantially disposed adjacent to at least one of the substrates.

Yet another aspect of the present invention, as set forth above, is to polymerize the prepolymer material by ultraviolet (UV) exposure, wherein exposure of the ultraviolet light on one side of the cell causes the polymer layer to form adjacent the substrate nearest the ultraviolet light source.

A further aspect of the present invention, as set forth above, is to control the power, collimation, and exposure time of the ultraviolet light to create grooves, channels or patterns that receive the LMW organic material, which may be a liquid crystal.

Still a further aspect of the present invention, as set forth above, is to treat one or both substrates with an alignment layer.

Yet a further aspect of the present invention, as set forth above, is to control the cell gap, the type and treatment of the alignment layers, and the temperature at which the phase separation occurs so as to alter the structure and operational characteristics of the cell.

Still another aspect of the present invention, as set forth above, is to apply an external force, such as an electric or magnetic field normal to the substrates; optical radiation; or a change in temperature in order to cause desired optical switching of the composite organic film.

An additional aspect of the present invention, as set forth above, is to use a non-liquid crystalline material, a chiral or non-chiral nematic LC material, a ferroelectric LC material, an antiferroelectric LC, a monomer, polymerizable under conditions different from that of the phase separation as the LMW organic material.

Yet an additional aspect of the present invention, as set forth above, is to use a prepolymer that may be phase separated by polymerization induced phase separation (PIPS), thermally induced phase separation (TIPS), solvent induced phase separation (SIPS), and wherein the prepolymer may contain additives and/or may be a multi-functional prepolymer.

Still an additional aspect of the present invention, as set forth above, is to dispose a solid or polymer semiconductor material, or a solid ferroelectric film adjacent one or both of the substrates for modifying the behavior of the LMW organic materials and, in particular, to render a cell "photoswitchable" with optical radiation.

The foregoing and other aspects of the present invention which shall become apparent as the detailed description proceeds are achieved by a light modulating cell, comprising a pair of opposed substrates, an alignment layer disposed on at least one of the opposed substrates facing the other of the opposed substrates, and a layer of polymeric material and a layer of low molecular weight (LMW) organic material adjacent to one of the substrates with the alignment layer.

Other aspects of the present invention are obtained by a method for fabricating a phase separated composite organic film, comprising the steps of preparing a solution of prepolymer and low molecular weight (LMW) organic material, providing a pair of substrates with a cell gap therebetween, disposing the solution into the cell gap, inducing phase separation of the solution to form at least one layer of polymeric material adjacent to one of the pair of substrates and a layer of LMW organic material.

BRIEF DESCRIPTION OF THE DRAWINGS

For a complete understanding of the objects, techniques and structure of the invention, reference should be made to the following detailed description and accompanying drawings wherein.

BEST MODE FOR CARRYING OUT THE INVENTION

Figure 1:
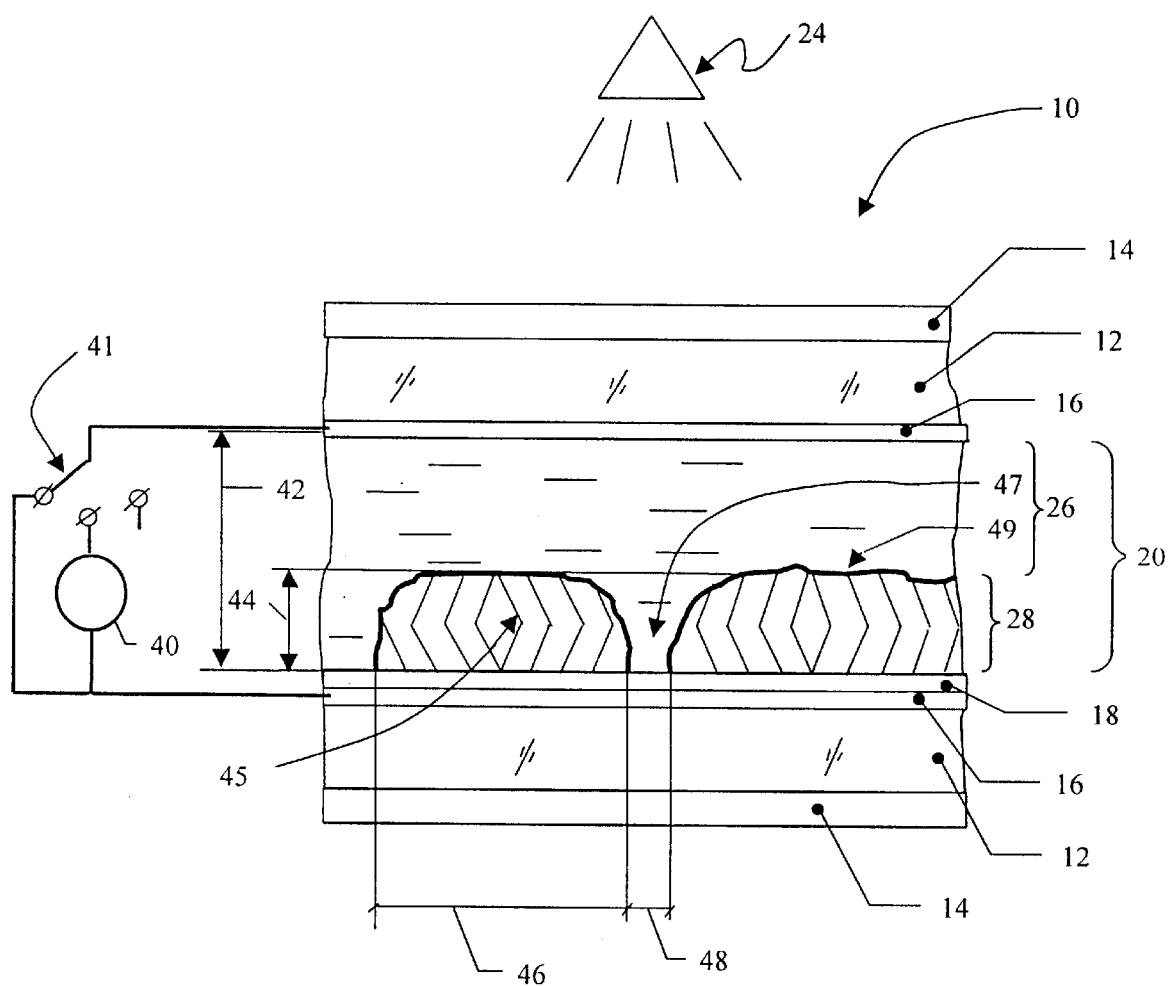
FIG. 1 is an enlarged, partial cross-sectional, schematic view of a transmissive light modulating cell, according to the present invention.
Figure 2:
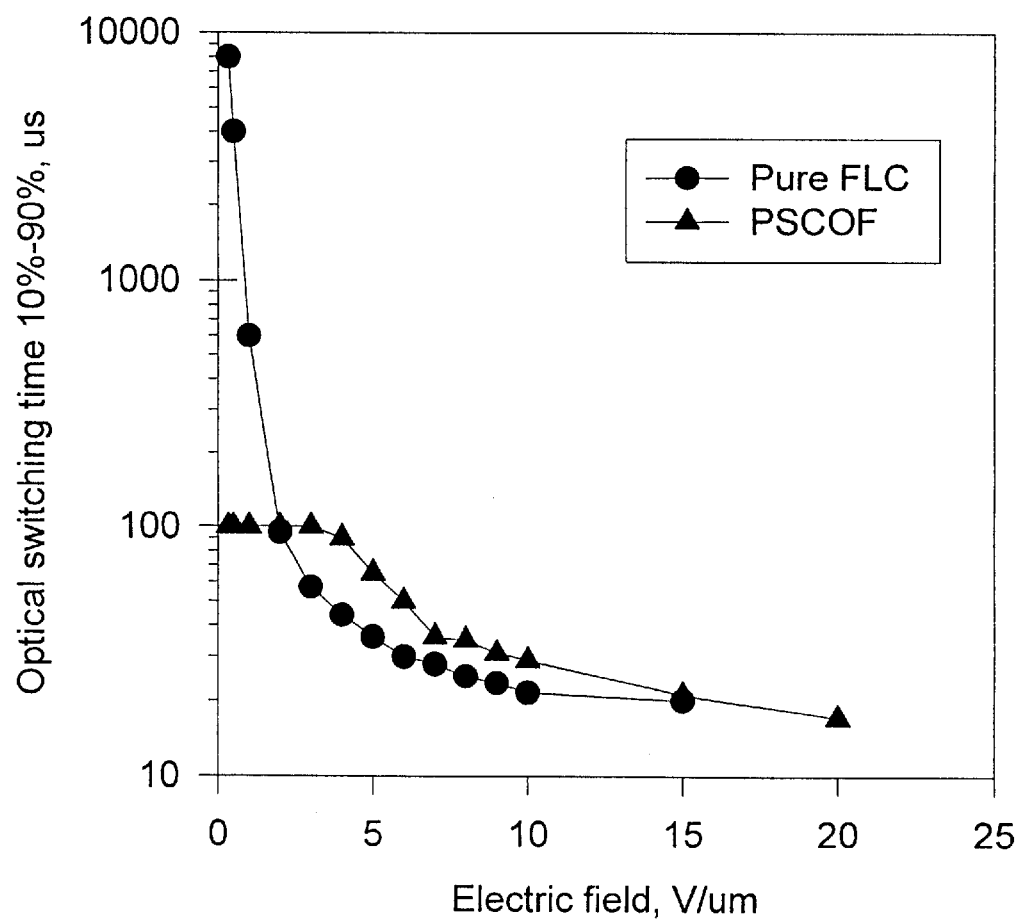
FIG. 2 is a graphic representation of the switching time vs. electric field applied to a cell of the present invention in comparison to a SSFLC cell.
Figure 3:
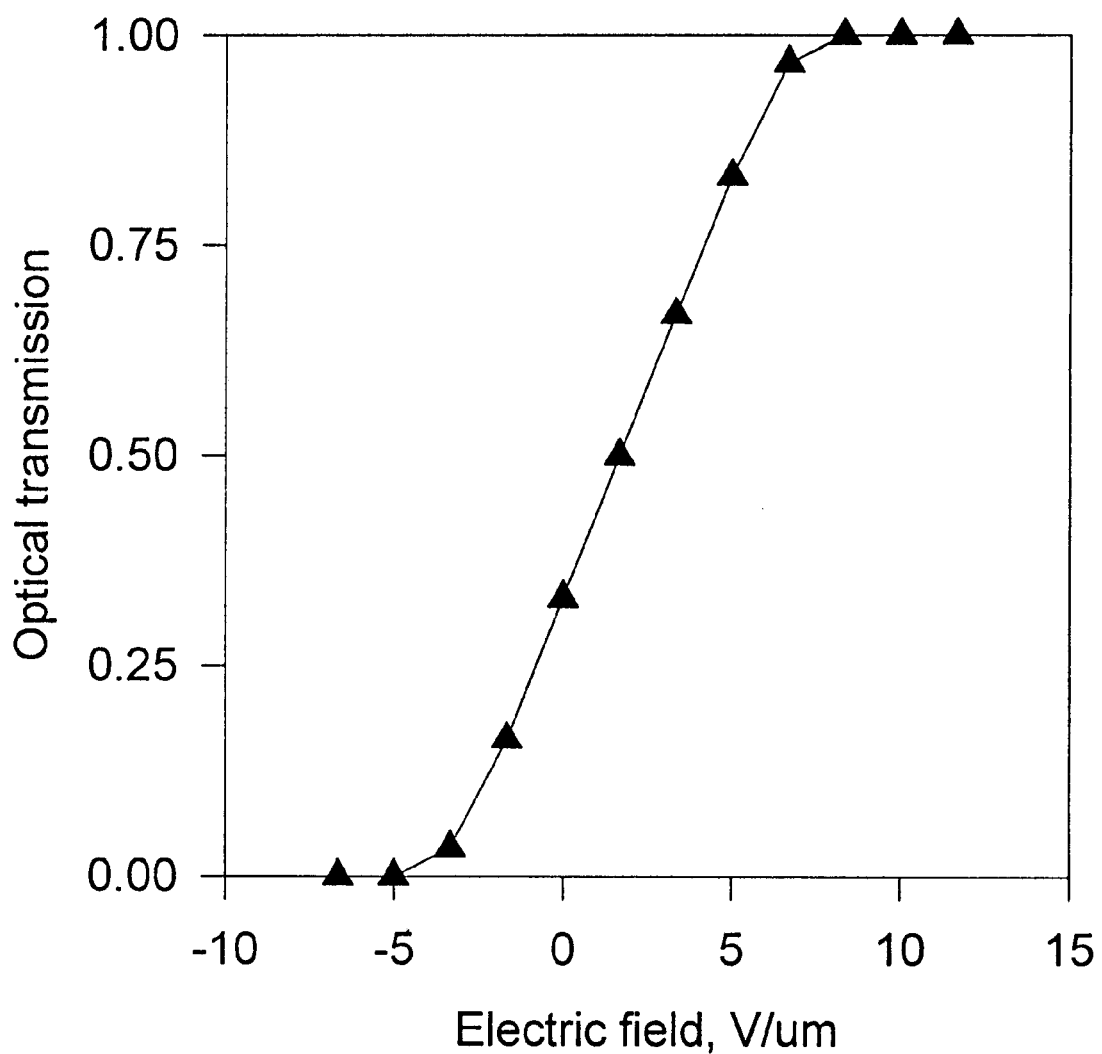
FIG. 3 is a graphic representation of normalized optical transmission vs. applied electric field which demonstrates grey scale capabilities of the present invention.

Referring now to FIG. 1, it can be seen that a light modulating cell, according to the present invention, is designated generally by the numeral 10. As will become apparent, the light modulating cell 10 is not sensitive to the external stresses and shocks that might otherwise damage or harm other types of light modulating cells and especially those made utilizing ferroelectric and antiferroelectrical liquid crystal materials. The light modulating cell 10 is manufactured much like other light modulating cells and provides improved electrooptical properties, such as higher brightness and lower background light scattering, over PDFLC devices while possessing the desirable performance features of SSFLC devices. Higher cell thickness, grey scale and faster response at low fields, as shown in FIGS. 2 and 3, are clear advantages over SSFLC devices. Although the present embodiment utilizes ferroelectric liquid crystal material, other low molecular weight (LMW) organic materials such as nematic, cholesteric, other chiral and non-chiral ferroelectric and antiferroelectric liquid crystals, polymerizable monomers, etc., could easily be incorporated into a cell manufactured by the techniques disclosed herein. Nematic PSCOF devices require a chiral additive to create a twisted nematic (TN) structure. A low molecular weight material, for purposes of this invention, is any material that is non-polymerizable during any of the disclosed phase separation processes.

Figure 1A:
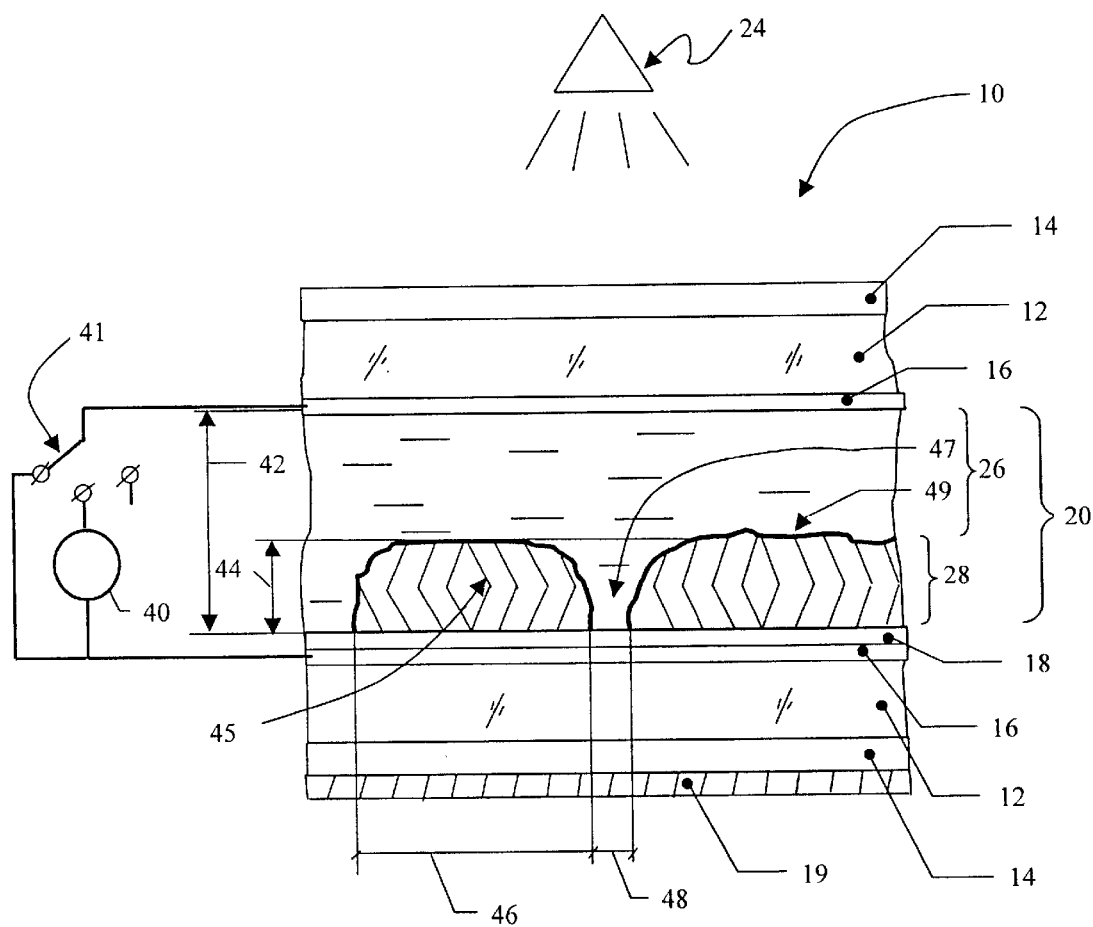
FIG. 1A is an enlarged, partial cross-sectional, schematic view of a reflective light modulating cell, according to the present invention.

The light modulating cell 10, shown in FIG. 1, includes a pair of opposed, optically clear substrates 12 which may be glass, plastic or other material commonly known in the art. A polarizer 14 may be disposed on the outer surface of each substrate 12 for the purpose of modifying the optical characteristics of transmitted light to provide a cell for operation in transmissive mode. An electrode 16 may be provided on the inside surfaces of each of the substrates 12. In the preferred embodiment, each electrode 16 is an indium-tin oxide material. An alignment layer 18 may be provided adjacent to the electrode 16 in order to control the orientation of the LMW organic material enclosed between the substrates 12. Both of the substrates 12 may be treated with an appropriate alignment layer in order to obtain the desired optical performance of the light modulating cell 10. Alternatively, as seen in FIG. 1A, to provide a cell for operation in reflective mode, a mirror or a light diffuser 19 may be added to the outside of the cell opposite to the light source. In certain applications, the polarizer adjacent to the mirror or light diffuser may not be necessary.

A composite organic material 20, such as a ferroelectric smectic-C* liquid crystal with prepolymer, is captured between the substrates 12. The ferroelectric smectic-C* liquid crystal is combined in a solution with prepolymer and filled between the substrates 12 by capillary action. Of course, other known methods of filling may be employed. The edges of the substrates 12 are sealed, utilizing known methods.

A device for phase separating the composite organic material 20, such as an ultraviolet light source 24, is employed to phase separate the LMW material from the polymer. This is known as polymerization induced phase separation. In particular, a light transmissive solidified polymer layer 26 is formed on the substrate 12 adjacent the light source 24 on the side opposite the polarizer 14. A LMW organic film layer 28, which in this case is the ferroelectric smectic-C* liquid crystal, is formed on the opposed substrate 12, adjacent to the alignment layer 18. In other words, the light modulating cell 10 provides at least one light transmissive solidified polymer layer 26 that is uniformly spread over one substrate 12 and a LMW organic layer 28, which is formed adjacent the substrate 12 with the alignment layer 18. This alignment layer 18 causes macroscopic alignment of the ferroelectric smectic-C* liquid crystal material. It will be appreciated by those skilled in the art that an alignment layer adjacent the polymeric layer 26 may facilitate orientation of the LMW organic material, especially when the polymer layer 26 is relatively thin. The LMW organic film layer 28 is configured to modulate light in a birefringent mode with the application of an external force. Phase separation may also be induced chemically, thermally, or with solvents.

A power source 40 is attached to the electrodes 16 through a switch 41. The switch 41 can be used to connect the power source, short the two electrodes, or disconnect the electrodes to store charge on them. Application of an electric or electromagnetic field or other external force causes optical switching of the ferroelectric liquid crystal material. Operation of the switch 41 may be controlled by an appropriately designed electronic drive. Use of an electronic driver circuit allows particular areas of a matrix cell to be addressed, which in turn allows creation of high contrast between the areas.

Upon the application of an external electric field, molecules of FLC experience a torque due to the interaction between the field and a spontaneous polarization (P) of FLC material. If the applied field is sufficiently high, this torque reorients the molecules so that P is pointing in the direction of the electric field. If the voltage applied by the conducting electrodes is reversed, the molecules reorient again so that P is also reversed. The two opposite directions of applied field cause two different optical states to appear. One of these states is designated as an "ON" state and the other one as an "OFF" state. Applied electric fields, not sufficiently high to force P to become parallel to itself, cause partial reorientation of FLC molecules resulting in "grey" levels having optical transmission between the "ON" and "OFF" states. The level of transmission depends on the strength of the applied field and is shown in FIG. 3, resulting in a full grey scale light modulating cell.

As shown in FIG. 1, a cell gap thickness between one substrate 12 and the alignment layer 18 is defined by a dimension 42 and a thickness of the LMW organic film layer 28 is shown by a dimension 44. When polymerized, the polymer film layer 26 develops at a surface 49 adjacent to the LMW organic film layer 28. The film layer 28 includes chevron structures 45 having an average lateral dimension 46 separated by a ridge 47 of polymer material having an average dimension 48. The formation of ridges 47, which provide mechanical support to the substrates 12, render these devices mechanically and thermally rugged. When using the polymerization induced phase separation method (exposure of UV light of appropriate wave length), certain variables affect the dimensions 44, 46, and 48. These variables include, but are not limited to: the chemical nature and structure of the ferroelectric liquid crystal and the prepolymer in the solution; the percentage composition of the materials used in the solution; the type and placement of alignment layer(s) and method of its preparation and treatment; the temperature at which the phase separation takes place; the power, collimation and direction of the illumination; and the cell gap thickness dimension 42.

EXAMPLE 1

The preferred embodiment of the invention is further exemplified by the following non-limiting example.

A ferroelectric liquid crystal (FLC) material Felix 15-100, available from Hoechst, Germany, was dissolved in Norland Optical Adhesive, NOA 65, available from Norland Products, Inc., U.S.A., in the following proportions:

| Felix 15-100 | 80 mg | 40% |
| NOA 65 | 120 mg | 60% |

The uniform solution was prepared by adding components in a container and then heating the solution up to 120° C. and cooling it down. To prepare a cell for the mixture, two indium-tin-oxide (ITO) coated glass substrates were employed. On one of the substrates, a poly-vinyl-alcohol (PVA) alignment layer was deposited by spin coating and was then dried at the temperature 80° C. for thirty minutes. Next, the alignment layer was unidirectionally rubbed with a cloth. The two substrates were separated by spacers of three μm in diameter and then assembled into a cell. The cell was filled with the mixture under capillary action at a temperature of 120° C. and then cooled down to 90° C. At this temperature, the cell was illuminated for five minutes by radiation from a 1000 W Mercury Arc lamp through a dichroic mirror (Oriel Corp., Model 66227). To obtain the aligned structure of the FLC, the substrate with the alignment layer was placed far from the UV source. Power of the radiation was controlled by the electrical power supply to the lamp and operated at 300 W. After the ultraviolet illumination, the cell was cooled down at a rate of 8° C./minute.

Variations of Example 1 include the use of other kinds of organic materials and varying the amount of material in the mixture. The following may also be used to prepare the polymer separated composite organic film structure:

nematic LC E7(BDH limited);
antiferroelectric liquid crystal MHPOBC;
FLC mixtures consisting of phenyl-pyrimidine matrix and non-mesogenic optical active dopants.

The amount of the organic material in the solution with the polymer was changed over a wide range, for instance, from about 10% weight to about 90% weight. This results in a different thickness dimension 44 of the liquid crystal layer 28 and also changes the dimensions 46 and 48.

The phase separated composite organic file (PSCOF) structure with a liquid crystal in either nematic or smectic phase possesses the electrooptical effects pertaining to the particular phase upon electric field application. To demonstrate the bulk switching in chiral smectic C phase (SmC*), driven by the electric field-spontaneous polymerization interaction, the PSCOF cell prepared as in Example 1 may be placed between crossed polarizers with an applied electric field. Continuous change in optical transmission in response to continuous change in the applied field was observed. The cell of Example 1 was found to provide a contrast ratio of about 100 for white light and a transmission of about 50% with respect to transmission with parallel polarizers. The contrast ratio can be increased by reducing the number of zig-zag defects by appropriate thermal cycling of the device.

Referring now to FIG. 2, it can be seen that an exemplary PSCOF cell provides improved switching times at lower applied voltage values. This allows for PSCOF cells with faster refresh rates at low voltages. PSCOF devices are also advantageous over SSFLC devices as they are not as sensitive to shock and stress because of the formation of polymer ridges which provide rigid support between the two substrates.

Referring now to FIG. 3, it can be seen that an exemplary PSCOF cell exhibits grey scale properties. Active addressing with relatively low voltage values can be utilized to maintain the desired optical level appearance.

Figure 4:
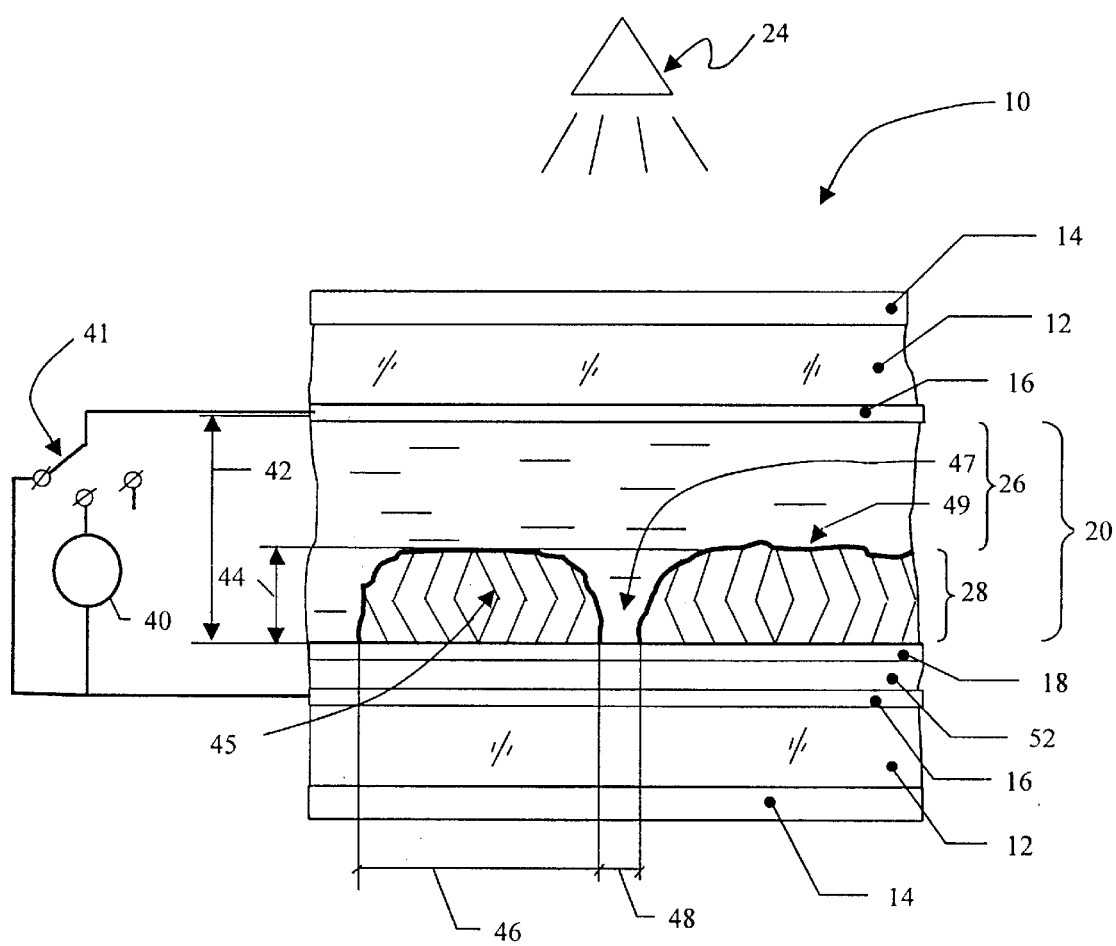
FIG. 4 is an enlarged, partial cross-sectional, schematic view of a light modulating cell with a photo-sensitive layer.

It is possible to build a device with the above PSCOF method, which responds to electrical as well as optical fields. For this purpose, appropriate functional groups can be attached to the polymer or special additives included in the solution. The functional groups and additives provide electrical charge generation, transfer and storage upon the application of electric and optical fields used for addressing the device. It renders the response of the device dependent on the intensity of the optical field. Alternatively, as seen in FIG. 4, a photo-sensitive layer 52 may be provided adjacent either the LMW organic film layer 28 or the polymer film layer 26, between the corresponding electrode 16 and alignment layer 18. The photo-sensitive layer 52 may be a solid or polymer semi-conductor material, or a solid ferroelectric film.

As can be seen from the foregoing structure and method of manufacture, the phase separated composite organic film light modulating cell has numerous advantages. Primarily, the cell 10 is immune to shock and stress while being quite simple to fabricate. During the unique method of preparation, the optical properties of FLC exhibit less sensitivity to cell gap nonuniformity. The cell of the present invention is also compatible with existing manufacturing technologies. Since only one substrate may have an alignment layer, the substrate having sensitive structures such as a thin film transistor array does not need treatment thus dramatically increasing the yield of such devices. The polymer layer 26 can serve as an insulating and adhesive layer, thus removing the possibility of short-circuiting, allowing the application of high voltages to the cell when necessary, and improving charge holding properties. Accordingly, the disclosed method provides a new and unique way to prepare uniform films of liquid crystal or other organic materials without the use of spacers of the same dimension as the liquid crystal layer. Another advantage of PSCOF devices is that they can operate in either a transmissive or a reflective mode. A cell constructed with one polarizer and a reflector behind it has small overall thickness and provides high reflectivity.

Thus, it can be seen that the objectives of the invention have been attained by the structure and the methods presented above. While in accordance with the patent statutes, only the best mode and preferred embodiment of the invention have been presented and described in detail, the invention is not limited thereto or thereby. Accordingly, for an appreciation of the true scope and breadth of the invention, reference should be made to the following claims.

What is claimed is:

1. A light modulating cell, comprising:
    a pair of opposed substrates;
    an alignment layer disposed on at least one of said opposed substrates facing the other of said opposed substrates; and
    a composite material phase separated into a layer of polymeric material primarily disposed adjacent the other of said opposed substrates, and a layer of low molecular weight (LMW) organic material primarily disposed adjacent to one of said substrates with said alignment layer.

2. The light modulating cell according to claim 1, further comprising:
    an electrode layer disposed on each said substrate facing both said layers; and
    an electrical power source connected to said electrode layers for applying an electric field to alter the optical appearance of the cell.

3. The light modulating cell according to claim 1, further comprising:
    a polarizer disposed on each of said substrates.

4. The light modulating cell according to claim 1, wherein said composite material is formed into said layers in substantially planar form by phase separation from a solution of prepolymer and LMW organic material which has anywhere between about 10% to about 90% prepolymer of the total weight of said solution.

5. The light modulating cell according to claim 4, wherein said layer of LMW organic material contains substantially uniformly sized ridges of polymer material integral with said layer of polymeric material and the other of said substrates.

6. The light modulating cell according to claim 4, wherein said layer of LMW organic material is a layer of ferroelectric liquid crystal.

7. The light modulating cell according to claim 6, wherein said layer of ferroelectric liquid crystal adheres to said alignment layer when said solution is phase separated.

8. The light modulating cell according to claim 1, wherein said layer of LMW organic material is selected from the group consisting of ferroelectric liquid crystal, nematic liquid crystal, cholesteric liquid crystal, anti-ferroelectric liquid crystal, and polymerizable monomers.

9. The light modulating cell according to claim 1, wherein said layer of polymeric material includes additives.

10. The light modulating cell according to claim 1, wherein said layer of polymeric material includes multifunctional groups attached to the polymer.

11. The light modulating cell according to claim 1, further comprising
    a reflective element on one of said substrates on a side opposite said cell gap; and
    a polarizer on the other of said substrates on a side opposite said cell gap.

12. The light modulating cell according to claim 11, further comprising:
    a polarizer disposed between said reflective element and said one substrate.

13. The light modulating cell according to claim 1, further comprising:
    an alignment layer disposed on said substrate adjacent to said layer of polymeric material.

14. The light modulating cell according to claim 1, further comprising:
    a photo-sensitive layer disposed between said alignment layer and said substrate.

15. A method for fabricating a phase separated composite organic film, comprising the steps of:
    preparing a solution of prepolymer and low molecular weight (LMW) organic material;
    providing a pair of substrates with a cell gap therebetween;
    permanently disposing said solution into said cell gap; and
    inducing phase separation of said solution to form at least one layer of polymeric material primarily disposed adjacent to one of said pair of substrates and a layer of LMW organic material primarily disposed adjacent the other of said pair of substrates.

16. The method according to claim 15, further comprising the step of:
    providing an alignment layer on one of said substrates facing the other of said substrates adjacent said layer of LMW organic material.

17. The method according to claim 16, further comprising the step of:

providing an alignment layer on the other of said substrates adjacent said layer of polymeric material.

18. The method according to claim 16, wherein said step of inducing phase separation comprises the step of:

exposing said substrate without said alignment layer to ultraviolet light which polymerizes said polymeric material adjacent at least said substrate opposite said substrate with said alignment layer.

19. The method according to claim 18, further comprising the steps of:

providing said solution with between about 10% to about 90% prepolymer of the total weight of said solution; and providing ferroelectric liquid crystal for said LMW organic material.

20. The method according to claim 19, further comprising the steps of:

providing a polarizer on both said substrates opposite said cell gap;

providing an electrode on each said substrate opposite said polarizers; and connecting a power source to said electrodes for the purpose of driving said ferroelectric liquid crystal from one optical state to another.

21. The method according to claim 19, further comprising the steps of:

providing a reflective element on one of said substrates opposite said cell gap;

providing electrodes on each said substrate adjacent said cell gap; and connecting a power source to said electrodes for the purpose of driving said ferroelectric liquid crystal from one optical state to another.

22. The method according to claim 21, further comprising the step of:

providing a polarizer between said reflective element and said one substrate.

23. The method according to claim 15, wherein said step of inducing phase separation is selected from the group of steps consisting of polymerization inducement, thermal inducement, and solvent inducement.

24. A light modulating cell, comprising:

a pair of opposed substrates; and a composite material having prepolymer and low molecular weight (LMW) organic material, wherein said composite material is phase separated to form:

a layer of polymeric material primarily adjacent one of said substrates; and a layer of LMW organic material primarily adjacent the other of said substrates.

25. The light modulating cell according to claim 24, further comprising:

an electrode layer disposed on each said substrate facing both said layers; and an electrical power source connected to said electrode layers for applying an electric field to alter the optical appearance of the cell.

* * * * *